United States Patent Office 3,531,998
Patented Oct. 6, 1970

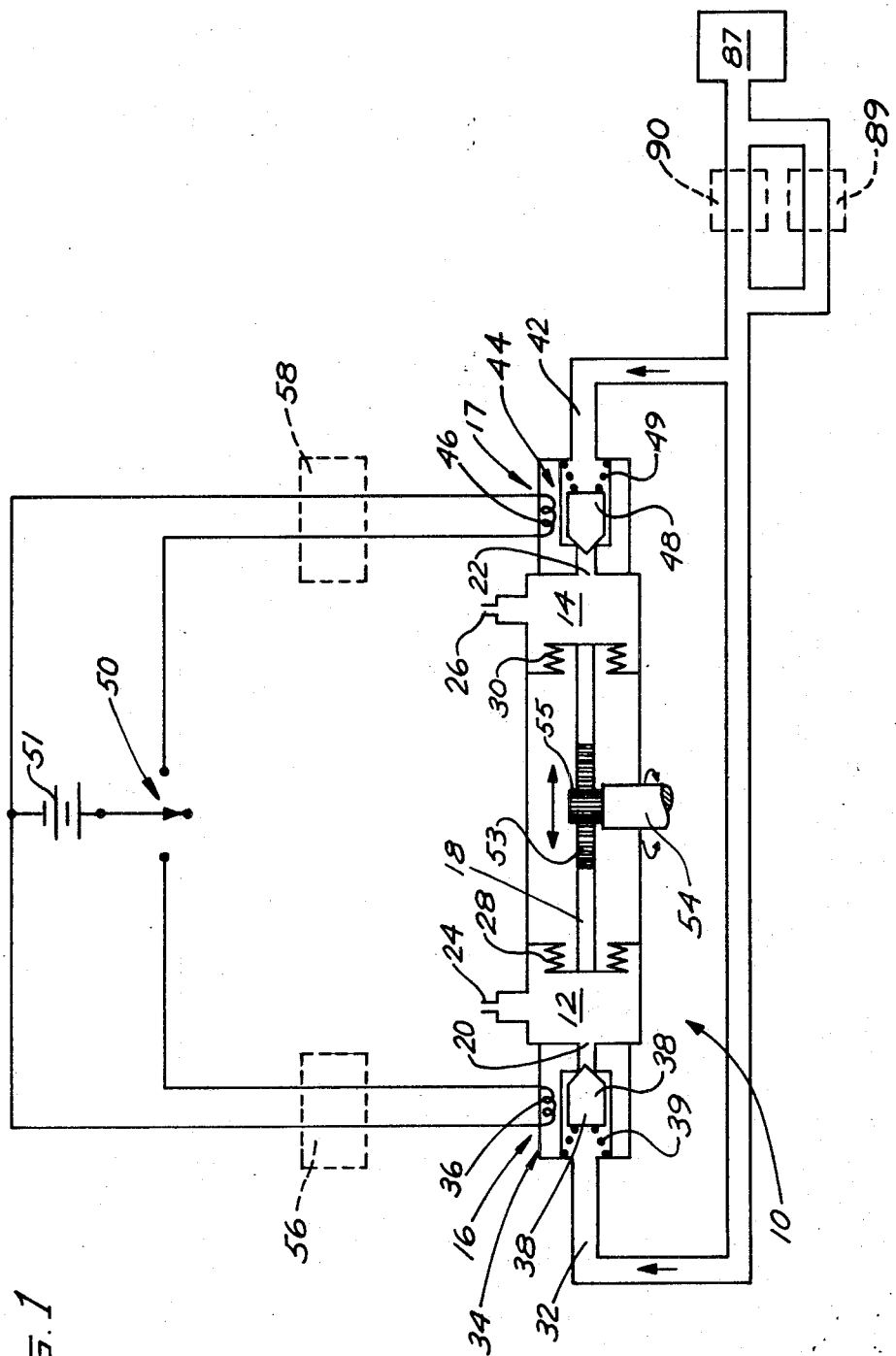

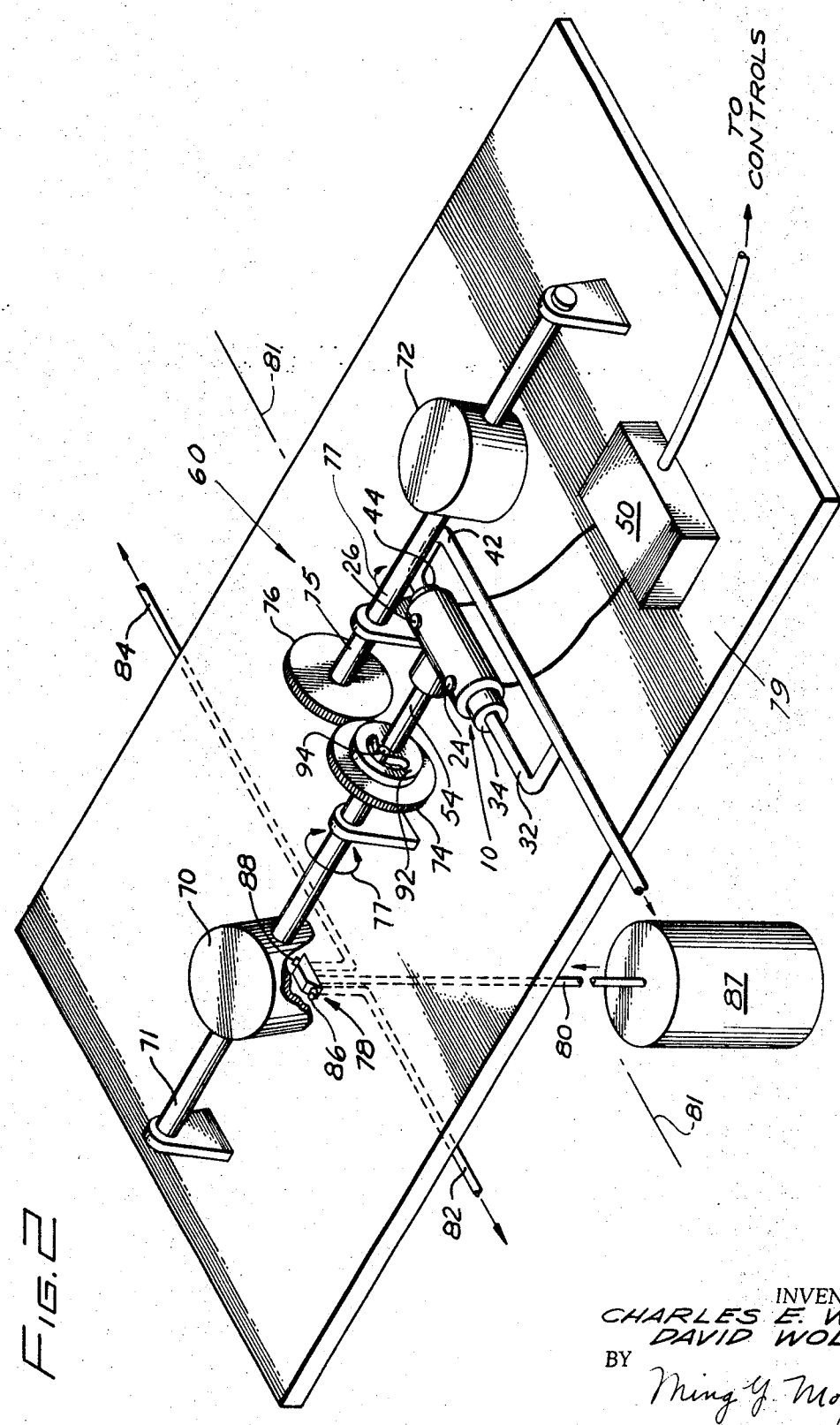

3,531,998
PNEUMATIC ACTUATOR
Charles E. Warn, La Palma, and David Wolkov, Woodland Hills, Calif., assignors to North American Rockwell Corporation
Filed Mar. 8, 1968, Ser. No. 711,767
Int. Cl. G01c 19/12
U.S. Cl. 74—5.34                                    7 Claims

ABSTRACT OF THE DISCLOSURE

A pneumatic actuator which includes (a) two chambers, each having an input port, a constant bleed orifice, and a flexible wall, (b) a driving member interconnecting the flexible walls, and (c) valve means for controlling fluid flow to each of the input ports to regulate pressure in the chambers. A pressure increase in one of the chambers will actuate the driven member and cause a simultaneous change in volume of the other chamber.

BACKGROUND

Present day excursions into space have directed attention to the dual problems of stabilizing and orienting a body. Since there is no friction in space, once a body in space starts to tumble, it tumbles continuously; and once a body attains a movement, it maintains the movement at a constant velocity. Under some conditions, these movements are undesirable, as for example, movements would continue until some force is applied to stop them. For stabilizing and orienting a body in space, a simple lightweight system using gyroscopes, reaction jets, and no electronic circuitry, has been developed. Such a system is described in a co-pending U.S. patent application Ser. No. 490,796, filed Sept. 28, 1965 by Reynold V. Halstenberg for Stabilization-Orientation System.

As disclosed in above identified U.S. patent application, an astronaut can orient himself by employing a suitable mechanism to force the gyroscope pairs to precess. The resultant angular displacement of the gyroscopes would cause the astronaut to pivot in the desired direction. Such a suitable mechanism is a force generating device or an actuator that is connected to the input shaft of the gyroscope pairs for causing the gyroscopes to separate or approach each other.

Prior art actuators include electrical devices requiring a substantial power input and mechanical devices requiring manual operation such as those described in the above identified U.S. patent application. Accordingly, it is an object of the present invention to provide an improved actuator requiring substantially less power input and capable of remote operation.

SUMMARY OF THE INVENTION

In carrying out the principles of this invention according to a preferred embodiment thereof, there is provided a driving member mounted for bi-directional motion, two continuously vented chambers each having force exerting means responsive to a pressure variation therein of a predetermined sense for exerting forces of mutually opposite sense upon the driving member, and control means for selectively varying pressure in each of the chambers.

One feature of this embodiment is the provision of a self-recentering capability for its driving member by the inclusion of means for resiliently urging the driving member in opposition to the force exerted by the force exerting means. The preferred embodiment employs bellows to perform the functions of the force exerting and the resilient urging means. When attached to opposing ends of a driving member, the bellows provide a low friction device capable of being used for delicate instrumentation. Each chamber includes a constant bleed orifice for pressure drain; this provision helps to obtain the fast reaction time required to accurately torque sensitive instruments that may be connected to the driving member. This actuator, in combination with gyroscopes and reaction jets, provides a simple light-weight stabilization-orientation system requiring minimum input power and capable of being remotely controlled.

DRAWINGS

Other objects, advantages, and features of the invention, both as to its construction and mode of operation will be readily appreciated as the same becomes better understood by reference to the following detailed description, when considered in connection with the accompanying drawings in which:

FIG. 1 is a schematic view illustrating one embodiment of the invention;

FIG. 2 is a schematic view of a stabilization-orientation system incorporating the embodiment illustrated in FIG. 1.

DESCRIPTION

Referring to the drawings wherein like reference numerals refer to like parts throughout, there is shown in FIG. 1 a pneumatic actuator 10 having continuously vented chambers 12 and 14 interconnected by a driving member 18 and control means 16 and 17 for selectively varying pressure in the chambers.

Each chamber 12–14 has an input pressure port 20–22, a constant bleed orifice 24–26, and a movable wall 28–30. The movable walls 28 and 30, connected to each other by a driving member 18, such as a rigid bar or shaft, are responsive to pressure variations in the chambers 12 and 14 for exerting forces upon the driving member. The chamber 12 is connected to the control means 16 which includes a solenoid valve 34 having coil 36, plunger 38, and a biasing means such as spring 39. Valve 34 includes an inlet portion which is connected to a continuously regulated pressure supply 87 through passage or conduit 32. Similarily the chamber 14 is connected to pressure supply 87 through passage or conduit 42 and control means 17, which includes solenoid valve 44 having coil 46, plunger 48, and biasing means such as spring 49. Both valves 34 and 44 are controlled by a switch 50 which is electrically connected to a battery or power source 51.

Operationally, solenoid valves 34 and 44 are closed, with plungers 38 and 48 covering input ports 20 and 22 completely, when switch 50 is in the neutral position illustrated. When switch 50 is commanded to a left position, solenoid valve 44 remains closed while solenoid valve 34 is actuated by energization of coil 36 causing plunger 38 to leave pressure port 20, to allow pressure to enter the chamber 12. The pressure increase in chamber 12 moves driving member 18 toward the right in the illustration by means of compression of bellows or movable wall 28.

The substantially rectilinear motion of the driving member 18 is translated into rotary motion of a rotatable output shaft 54 by the use of suitable translating means. Shown in FIG. 1 is a simple translating means having rack 53 formed on driving member 18 and having a pinion 55 fixed on the output shaft 54.

Conversely, when switch 50 is turned toward the right, solenoid 34 is de-energized while solenoid 44 is energized and opens to allow pressure to enter the chamber 14 thus forcing rack 53 to move toward the left by means of the movable wall 16. The substantially rectilinear motion of the rack is converted into rotary motion of the pinion and output shaft 54. It can be seen that the rotary motion of output shaft 54 is a function of the lateral movements of the rack 18 which is dependent upon the pressure differential between the chambers 12 and 14 and the latter is regulated by solenoid valves 34 and 44. Further, switch 50 provides a means for separately operating valves means 34 and 44 to regulate pressure in the chambers 12 and 14, whereby increased pressure in one of the chambers will actuate the driving member 18 and a concomitant change in volume of the other chamber is provided by the constant bleed orifices 22 and 24.

The movable walls 28 and 30 are opposing bellows positioned in a face to face relationship and interconnected by rack 18. In addition to constituting a force exerting means for applying force to rack 18, bellows 28 and 30 also act to resiliently urge the driving member 18 in opposition to the forces exerted by the same bellows 28 and 30. The use of bellows 28 and 30 together with the provision of orifices 22 and 24 in the chambers 12 and 14 respectively, provide the actuator 10 with a self-recentering capability, since bellows 28 and 30 are resilient members which recenter when the pressure in the chambers 12 and 14 drains through respectively orifices 22 and 24 after solenoids valves 30 and 32 are commanded to stop fluid flow. If the constant bleed orifices were not provided it would be necessary to achieve decrease of pressure of one chamber to permit a pressure differential between the chambers 12 and 14.

As stated previously, each of the solenoid valves 34 and 44 opens when energized to allow pressure to enter respective chambers 12 and 14. The magnitude of the entering pressure depends on the duration of the open period of the solenoid valves 34 and 44 which is in turn dependent upon the duration of electrical pulse signal used to energize same. Thus, by varying the duration of the pulse signal, the magnitude of the force exerted on rack 53 through effective area of the bellows 28 and 30 and the magnitude of rack motion can be substantially proportionately controlled.

For remote operation there may be provided pulse modulation encoders schematically indicated by dotted lines at 56 and 58. Such an arrangement in the place of or in conjunction with manually operated switch 50 enables the system to receive pulse signals of varying amplitude and convert them into pulse signals of varying duration. The input signal to encoders 56 and 58 comprises the output of a command receiver or other suitable signal generating sources (not shown), and the output signals of the encoders 56 and 58 are used to control solenoid valves 34 and 44 respectively. Encoders 56 and 58 are well known in the art and they can be of types illustrated on pages 152 through 156 of the book entitled "Aerospace Telemetry" by Harry Stilts.

In addition to the use of encoders 56 and 58, the magnitude of the pressure entering the chambers 12 and 14 may also be regulated by employing pressure regulators of desired pressure range. If a low level pressure is desirable, a low range pressure regulator, schematically indicated by dotted lines at 90 is employed to restrict the gas flow to chambers 12 and 14. Similarly, if a high level pressure is desirable, a high range pressure regulator 89 is used. The pressure regulators each includes a restrictive orifice and a valve. For low torquing rates, the valve in high range regulator 89 is closed and the low range regulator valve is open; while for high torquing rates the valve in high range regulator 89 is open and the low range regulator valve is closed. Such an arrangement, in the place of or in conjunction with encoders 56 and 58, enables the system to control the pressure in the chambers 12 and 14 which in turn control the force exerted on driving member 18.

FIG. 2 shows a simple lightweight stabilization-orientation system 60 for stabilizing and orienting an astronaut or a spacecraft in space of which a more detailed description is found in the above mentioned patent application of Halstenberg. This system comprises two gyroscopic assemblies 70 and 72 containing rotors that are spinning in mutual opposite direction relative to the other, as indicated by the curved arrow 77 and since the rotors are preferably of substantially identical structures and are spinning at the same rate, the gyroscopes have substantially equal but opposite angular momentums. Gyroscopes 70 and 72 are shown coupled together by spur gears 74 and 76, but alternative couplings such as belts, chains, or the like may be used. As shown in FIG. 2, gyroscopes 70 and 72 are mounted on suitable shafts 71 and 75, which are in turn mounted to a base 79 that is suitably shaped and arranged to be carried by or strapped to an astronaut.

The result of the arrangement shown in FIG. 2 is that as the astronaut tends to pivot about on input axis 81; the oppositely spinning gyroscopes tend to precess in opposite directions about the output axis 71 and 75 that is, they change their angular relationship in a mutually opposite manner—increasing their angular displacement by spreading apart, or decreasing their angular displacement by approaching each other as indicated by curved double ended arrow 77. Because of the coupling arrangement 74 and 76, counter-spinning gyroscopes 70 and 72 precess equally in exactly the same manner and to the same extent but in opposite directions.

In FIG. 2, the valving arrangement 78 comprises a gas inlet line 80 and first and second gas outlet lines 82 and 84. The valving arrangement 78 being such that when a trigger 86 is depressed, gas from a source 87 flows through inlet line 80 and exits from outlet line 82. When the other trigger 88 is depressed, the gas exits from the second outlet line 84. Each gas outlet line 82 and 84 is connected to paired nozzles or reaction jets, each pair being oriented to pivot the astronaut in an opposite direction about the input axis (stabilization axis) 81.

Operationally, if the astronaut is stabilized, gyroscopes 70 and 72 are spinning in opposite directions and are not precessing—that is, are not moving toward or away from each other. However, when the astronaut is disturbed by some external force, the resultant torque tends to pivot the gyroscopic device at a given direction around input axis 81; this torque causes each gyroscope to precess in an opposite direction about their output axis and the torque tending to pivot the astronaut is absorbed in angularly displacing the two gyroscopes.

As long as the astronaut pivoting force is present, the gyroscopes continue to precess, thus absorbing the torque and stabilizing the astronaut. As soon as the disturbance ceases, the gyroscopes no longer precess and remain in the new angled position that they happen to have at the instant that the astronaut pivoting force is removed. If the astronaut pivoting force continues, the gyroscopes continue to precess and eventually they would reach an angular displacement where they could no longer absorb the torque that is causing the astronaut to pivot. At this time one of the gyroscopes, for example gyroscope 70, reaches predetermined angular position where it triggers valving arrangement 78 by depressing trigger 86. As previously explained, valving arrangements 78 has triggers that, when depressed, permit gas to flow through the outlet such as 82 and 84 to paired reaction jets where the exiting gas produces a torque about the axis of stabilization 81 in such direction that to opposes the torque that has been tending to cause rotation of the astronaut. As the astronaut is torqued by the jets in the opposite direction, gyroscopes 70 and 72 now approach each other, and as soon as gyroscopes have pivoted far enough to release trigger 86 of valving arrangement 78, the flow of gas through line 82 is stopped. At this point the gyroscopes are free to approach each other or to separate from each other depending on the disturbing torque experienced by the astronaut.

It may thus be seen that minor disturbing inputs experienced about the input axis are counteracted by the separation or approach of the gyroscopes, and major disturbances are corrected by the reaction jets.

The above described arrangement has been described as stabilizing an astronaut, but it may be also used to orient him. It is to this end, to provide commanded orientation, that the described embodiment of the present invention is directed. Orientation is achieved by employing the pneumatic actuator 10, the details of which are shown in FIG. 1, to force the gyroscopes 70 and 72 to precess, their resultant angle displacement causing the astronaut to pivot in a desired direction.

The output shaft 54 of the actuating means 10 is fixed to a slotted disc 92 that is pivotally mounted on spur gear 74 which has a fixedly positioned pin 94 that is positioned within the slot of disc 92.

In operation, actuator 10 is commanded "on" manually through switch 50 or remotely; the rotary motion of output shaft 54 causes disc 92 to rotate until the end of the slot abuts the pin 94. This causes the spur gear 76 to rotate part way; the maximum being approximately 45°. Since spur gear 74 and the gear 76 engaged therewith, are affixed to gyroscopes 70 and 72 respectively, the gyroscopes are forced to pivot away from each other, and this separation causes the astronaut to pivot. If the gyroscopes happen to be at the location where additional separation would trigger the valving arrangement 78 the forced separation due to the input command would then trigger the valving arrangement and would result from reaction jet action rather than from gyro separation. When the actuator 10 is commanded "off," the self-recentering provision of the actuator 10 centers slotted disc 92 without rotating the gyroscopes.

The above described operation of the invention shown in FIG. 2 is such that it stabilizes and orients an astronaut about one axis. Three such mutually orthogonal arrangements are provided to maintain three-axis stability.

Although the system has been described as a torque generating device for a stabilization and orientation system for an astronaut or a spacecraft, it can be readily appreciated that it has other applications whenever rotary or rectilinear actuating forces are desired. Typical applications include positioning of components such as shafts and valves.

Although a particular embodiment of the invention has been shown and disclosed herein, it is evident that numerous variations and modifications embodying the essential features may be made. The disclosed invention is, therefore, intended to cover all such changes and variations as lie within the spirit and scope of the invention.

What is claimed is:

1. A stabilization-orientation system comprising:
a gyroscopic device having a pair of counter-spinning gyroscopes;
coupling means for coupling the gyroscopes whereby the gyroscopes may vary their angular relationship;
actuating means, connected with said gyroscopic device, for causing said gyroscopes to change their angular relationship including:
  a driving member mounted for bi-directional motion and connected to torque the gyroscopes;
  first and second vented chambers, each of said chambers including force exerting means responsive to a pressure variation therein of predetermined sense for exerting forces of mutually opposite sense upon said driving member; and
  means for selectively varying pressure in each of said chambers.

2. The stabilization-orientation system of claim 1 wherein said force exerting means includes resilient means for urging said driving member in opposition to the force exerted by said force exerting means.

3. The stabilization-orientation system of claim 1 wherein force exerting means comprises opposing bellows positioned in a face to face relationship interconnected by said driving member.

4. A stabilization-orientation system comprising:
a gyroscopic device having a pair of counter-spinning gyroscopes capable of precessing in opposite directions;
coupling means for coupling said gyroscopes so that said gyroscopes may change their angular relationship;
actuating means for causing said gyroscopes to change their angular relationship, said actuating means including:
  a driving member mounted for substantially rectilinear bi-directional motion;
  two chambers, each including a constant bleed orifice, an input port, and a movable wall, said driving member being interconnected with said walls;
  valve means for controlling fluid flow to each of said input ports;
  operating means for separately operating said valve means to regulate pressure in said chambers, whereby increased pressure in one of said chambers will actuate said driving member and a concomitant change in volume of the other chamber is provided by the constant bleed orifice thereof, and means responsive to the driving member for torquing said gyroscopes.

5. The stabilization-orientation system of claim 4 wherein said movable walls comprise opposing bellows positioned in a face to face relationship.

6. The stabilization-orientation system of claim 5 wherein said actuating means includes a rotatable output shaft, said shaft having translating means for translating the substantially rectilinear motion of said driving member into rotary motion of said rotatable output shaft.

7. A stabilization-orientation system comprising:
a gyroscopic device having a pair of coupled counter-spinning gyroscopes;
a source of gas;
a valving arrangement having an inlet line connected to said gas source, a first trigger associated with a first pair of nozzles aimed to produce a pivotal motion in a first direction, and a second trigger associated with a second outlet line associated with a second pair of nozzles aimed to produce pivotal motion in the opposite direction;
means for causing said gyroscopic device to trigger said valving arrangement to connect said gas source with said first pair of nozzles when said gyroscopes have precessed a given amount in a first direction, and to trigger said valving arrangement to connect said gas source with said second pair of nozzles when said gyroscopes have precessed a given amount in a second direction;
coupling means for causing said gyroscopes to precess equally in opposite directions—whereby said gyroscopes may vary their angular relationship by separating or approaching each other;
actuating means for causing said gyroscopes to change their angular relationship including:
  a body having:
    two chambers, each including a constant bleed orifice, an input port, and a flexible wall, said walls comprise opposing bellows positioned in a face to face relationship;
    a driving member, mounted for substantially rectilinear bi-directional motion, interconnecting said bellows;
    a rotatable output shaft connected to torque said gyroscopes having translating means for translating the substantially rectilinear bi-directional motion of said driving member into rotary motion of said rotatable output shaft;
  solenoid valves connected to each said input ports for controlling fluid flow;
  conduit means for connecting said source of gas to said solenoid valves;
  operating means for separately operating said valves to regulate pressure in said chambers, whereby increased pressure in one of said chambers will actuate said driving member and a concomitant change in volume of the other chamber is provided by the constant bleed orifice thereof.

References Cited

UNITED STATES PATENTS

| | | | |
|---|---|---|---|
| 2,627,251 | 2/1953 | Sprague et al. | 92—138 XR |
| 2,811,047 | 10/1957 | Christoph | 74—5.34 XR |
| 2,844,128 | 7/1958 | Steiner | 92—138 XR |
| 2,847,868 | 8/1958 | Newman | 92—138 XR |
| 3,139,758 | 7/1964 | Lahde | 74—5.43 XR |
| 3,163,091 | 12/1964 | Grier | 92—138 XR |
| 3,280,644 | 10/1966 | Vold | 74—5.34 |
| 3,424,401 | 1/1969 | Maurer | 74—5.34 XR |

FRED C. MATTERN, Jr., Primary Examiner

M. A. ANTONAKAS, Assistant Examiner

U.S. Cl. X.R.

74—5.43